United States Patent [19]
Perez et al.

[11] Patent Number: 6,033,305
[45] Date of Patent: Mar. 7, 2000

[54] TOMATO HARVESTING APPARATUS WITH AIR BLAST DIRT REMOVED FEATURE

[75] Inventors: Thomas Perez, P.O. Box 97, Crows Landing, Calif. 95313; Frank C. Tenente, 1444 Vista Dr., Lodi, Calif. 95240; John A. Paoluccio, Modesto, Calif.

[73] Assignees: Thomas Perez, Crows Landing; Frank C. Tenente, Lodi, both of Calif.

[21] Appl. No.: 08/950,193

[22] Filed: Oct. 14, 1997

[51] Int. Cl.⁷ ..................................................... A01F 12/48
[52] U.S. Cl. ........................... 460/99; 460/114; 460/119; 460/143; 171/12; 171/17; 171/20
[58] Field of Search .................................. 171/10, 12, 17, 171/20, 25; 460/98, 99, 100, 114, 119, 143, 123; 198/431, 506, 510.1, 520

[56] References Cited

U.S. PATENT DOCUMENTS

| | | | |
|---|---|---|---|
| 3,921,723 | 11/1975 | Seem | 171/14 |
| 4,051,856 | 10/1977 | Reed et al. | 460/99 X |
| 4,118,311 | 10/1978 | Friedel, Jr. et al. | 209/75 |
| 4,229,932 | 10/1980 | Persoons et al. | 56/13.5 |
| 4,262,477 | 4/1981 | Turold et al. | 56/327 R |
| 4,345,655 | 8/1982 | Fahrenholz | 171/63 |
| 4,584,826 | 4/1986 | Bettencourt et al. | 56/327 R |
| 4,727,714 | 3/1988 | Karakolev et al. | 56/327.1 |
| 5,098,341 | 3/1992 | Kuchar | 460/99 |
| 5,376,046 | 12/1994 | Shuknecht et al. | 460/99 |
| 5,431,000 | 7/1995 | Shuknecht | 56/308 |

FOREIGN PATENT DOCUMENTS

| | | | |
|---|---|---|---|
| 1662406 | 7/1991 | U.S.S.R. | 460/143 |

*Primary Examiner*—Thomas B. Will
*Assistant Examiner*—Victor Batson
*Attorney, Agent, or Firm*—Robert S. Smith

[57] ABSTRACT

A produce harvesting apparatus, such as for harvesting tomatoes, which includes apparatus for harvesting produce, such as tomatoes, which includes an enclosed vehicle and a first conveyor belt extending forward of the vehicle for moving produce and associated vines into the enclosed vehicle. The apparatus further includes a ventilation system for drawing air from within the enclosed vehicle and expelling that air through an outlet that is disposed in alignment with the first conveyer belt to direct exhaust air from the enclosed vehicle toward the produce on the first conveyor belt whereby some dirt is dislodged from the produce and vines disposed on the first conveyor belt. The apparatus may have the outlet disposed to direct a stream of air from the enclosed vehicle in a direction that is aligned with the axis of the first conveyor belt. In some forms of the invention the apparatus further includes a second conveyor disposed within the enclosed vehicle, the second conveyor belt is aligned and disposed with respect to the first conveyor belt for receiving produce and vines from the first conveyor belt and a third conveyor belt disposed within the enclosed vehicle. The third conveyor belt may be substantially aligned with respect to the second conveyor belt.

2 Claims, 6 Drawing Sheets

TOMATO HARVESTING APPARATUS WITH AIR BLAST DIRT REMOVED FEATURE

BACKGROUND OF THE INVENTION

The invention relates to the harvesting of produce from large farms and particularly to harvesting of very high quality produce often referred to as market fresh produce. While the invention will be described in terms of the harvesting of tomatoes and has particular application to the harvesting of market fresh tomatoes, it will be understood that the invention also has application to various other types of produce. Market fresh tomatoes are currently hand picked during daylight hours. Attempts to fully mechanize the harvesting of market fresh tomatoes have been largely abandoned because such prior art apparatus result in excessive damage to the tomatoes. Those skilled in the art will recognize that harvesting of market fresh tomatoes is much more demanding than harvesting of tomatoes which are to be canned. Tomatoes intended for canning need not be handled as gently as market fresh tomatoes because damage to the tomatoes will not be visible on the canned product.

Up until the early 1970s tomato harvesting was strictly a manual operation. Field workers walked along the rows, picked the tomatoes and placed the picked tomatoes in buckets. These in turn would be loaded on a traveling storage trailer.

The problems with using strictly manual labor include: high labor costs, difficult work, and hazardous working conditions. The latter includes working in the sun, breathing dust, walking uneven dirt rows, bending, lifting, turning, twisting, stretching, carrying heavy buckets, and working around dangerous equipment. The workers are usually limited to working during daylight hours. This leads to high manual labor costs, injury to workers and high cost for hand picked tomatoes.

Subsequently, a number of mechanical tomato harvesting machines were developed. These all had one common goal, that is, eliminate the need for the worker. Machine harvesting of fresh market tomatoes has been tried in the past. Such machines attempted doing the whole operation. More specifically, a typical machine included mechanisms for cutting the vine, conveying the vines into the machine and then shaking the tomatoes mechanically off the vines and then conveying the tomatoes onto another conveyor and then onto a storage truck. This proved to be unsuccessful due to the bruising and damage to the tomatoes that occurs in shaking them off the vine and dropping the tomatoes onto the conveyor. This method has been discontinued. The main problem with all prior art mechanical harvesters is that, contrary to popular belief, fully automatic harvesting, does not result in a better overall job than the job produced by hand picking. The industry has been unable to develop a practical machine that can duplicate the unbelievable complex tasks of quickly visualizing each tomato, making a decision as to the value of the tomato, removing the tomato in a gentle and delicate manner and placing the tomato on a conveyor so as to avoid bruising the tomato.

Prior tomato harvesters are extremely complex, with a great number of moving and shaking parts. The shaking parts were required in an attempt to try and replace the delicate hand removal of the tomatoes. This complexity resulted in frequent mechanical equipment failures and numerous adjustments being necessary. The acquisition cost and operating cost were very high. This industry has made attempts to develop new varieties of tomatoes that can take more abuse in mechanical removal and other properties where the care and quality is not important. This practice has lead to picking tomatoes before they are ripe resulting in unappetizing tomatoes with a poor taste.

The historical approaches to harvesting of tomatoes is illustrated by a number of United States Patents that issued in the period between 1970 and 1989. Such patents included U.S. Pat. Nos. 3,986,561; 4,118,311; 4,262,477; and 4,584,826. All of these describe a chassis carried on wheels on which workers stand while sorting tomatoes. U.S. Pat. Nos. 4,426,832 and 4,727,714 describe additional aspects of the prior art apparatus. Most of these patents include shaking mechanisms to remove the tomatoes from the vines. Most cut the vines near the surface of the ground.

A primary object of this invention is to combine the best of man and machine in harvesting market fresh tomatoes. Stated another way, it is an object of the invention is to provide a machine that (1) will do that part of the harvesting task that can be accomplished by a machine without compromising the quality of the produce that is harvested and (2) will facilitate the manual accomplishment of the harvesting task that cannot be satisfactorily accomplished by a machine.

Another object of the invention is to avoid damage to the produce.

An additional object of the invention is to provide better working conditions for the personal that are required in the harvesting process and thus to ensure good productivity from this personnel.

Still another object is to facilitate harvesting the crop even if there is no sunlight.

Yet another object of the invention is to reduce overall labor costs.

SUMMARY OF THE INVENTION

It has now been found that these and other objects of the invention may be attained in a produce harvesting apparatus, such as for harvesting tomatoes, which includes an enclosed vehicle and a first conveyor belt extending forward of the vehicle for moving produce and associated vines into the enclosed vehicle. The apparatus further includes a ventilation system for drawing air from within the enclosed vehicle and expelling that air through an outlet that is disposed in alignment with the first conveyer belt to direct exhaust air from the enclosed vehicle toward the produce on the first conveyor belt whereby some dirt is dislodged from the produce and vines disposed on the first conveyor belt.

The apparatus may have the outlet disposed to direct a stream of air from the enclosed vehicle in a direction that is aligned with an axis of the first conveyor belt. In some forms of the invention the apparatus further includes a second conveyor disposed within the enclosed vehicle, the second conveyor belt is aligned and disposed with respect to the first conveyor belt for receiving produce and vines from the first conveyor belt and a third conveyor belt is disposed within the enclosed vehicle. The third conveyor belt may be substantially aligned with respect to the second conveyor belt.

In some forms of the invention the second conveyor belt has an upper flight and the upper flight is crowned whereby workers standing on the sides of the second conveyor belt are better able to see the produce and vines being carried on the second conveyor belt. The third conveyer belt may have an upper flight that is concave whereby produce is better contained on the third conveyer belt.

DESCRIPTION OF THE PREFERRED EMBODIMENT

Figure 1:
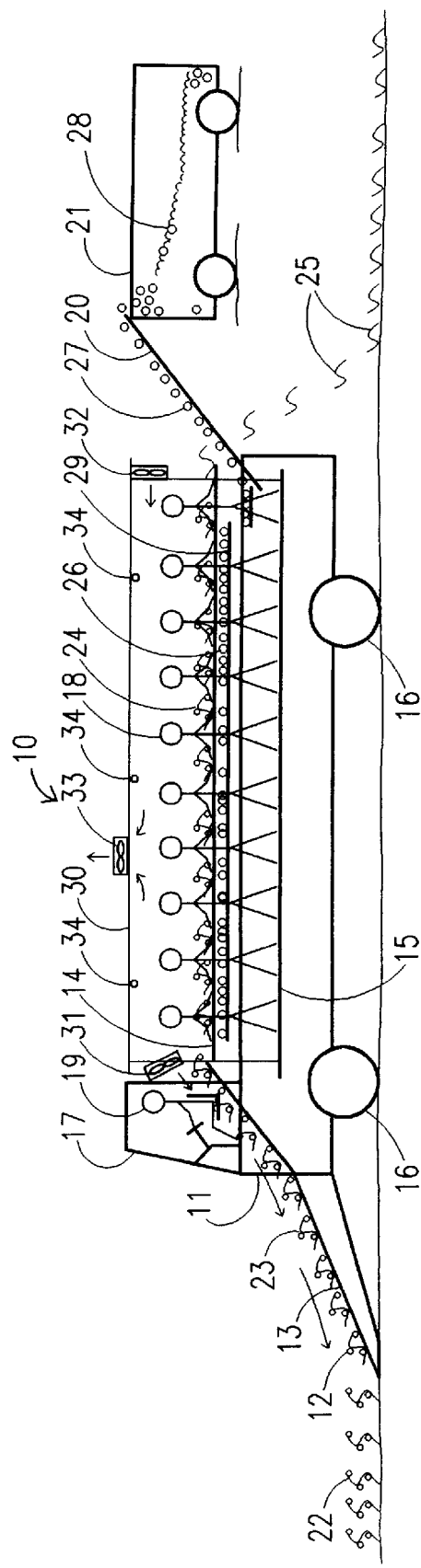
FIG. 1 is a schematic view of one form of the open harvester vehicle in accordance with the invention illustrating the standing workers within the vehicle and a storage vehicle following behind. The tomato vines are shown being cut from the rows, then traveling by conveyor belt to the worker area where the tomatoes are hand picked and then conveyed to the following storage vehicle.
Figure 3:
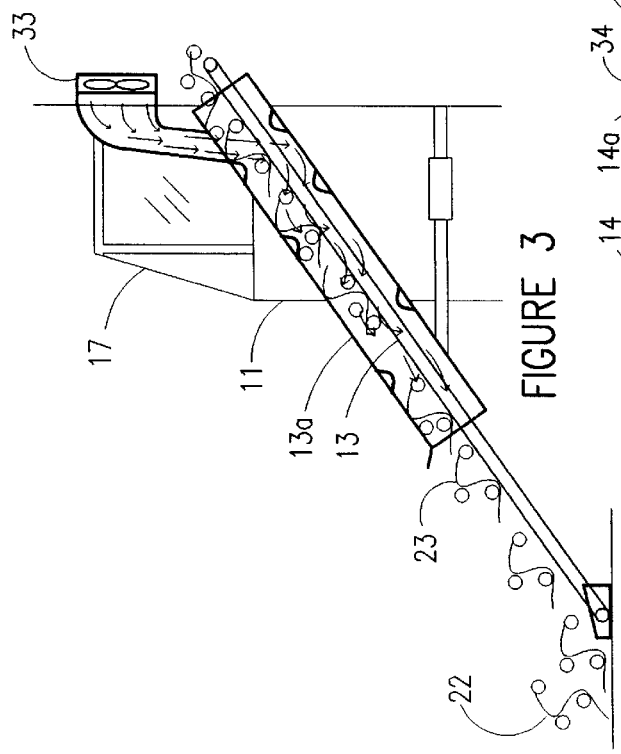
FIG. 3 is a enlarged schematic view of the exhaust air system and air flow pattern in the apparatus of FIG. 2 in the area of the covered conveyer belt where the tomatoes are pre-cleaned with dust laden air.

Those skilled in the tomato packing business recognize the desirability of improving on the prior art mechanical harvesters. The present inventors have attempted for years to make such changes and particularly to eliminate manual labor. These attempts have only reinforced the belief of the present inventors that certain delicate and technical tasks are best done by the workers. Such tasks include evaluating tomato quality. Agricultural workers typically have a valuable ability to quickly look at a tomato and make an almost instantaneous evaluation decision as to quality and worthiness of picking. Particularly in the fresh market tomato industry, no machine has yet come even close to the delicate bruise free hand picking that the worker can accomplish. The inventors concluded that a substantial improvement over the prior art would result with a combination of worker and machine, where machine was doing all the difficult, dangerous, time consuming, labor intensive tasks while allowing the workers to do the delicate and technical tasks of hand picking the tomatoes. This approach also allows for the machine portion to provide a safe environment and even provide lighting so the workers could pick the tomatoes in the cool of the evening, when the tomatoes can best be picked.

This invention includes a hand harvesting vehicle that travels through the rows of tomatoes that cuts the tomato vines from the row. The vines then travels by conveyor to an area in the harvester vehicle that houses 10 to 20 people. Each person can be seated for comfort or they may stand. As the tomato vine with tomatoes passes by they visually inspect the tomatoes and decide which tomatoes to keep and they hand pick them. The picked tomatoes are then gently placed on another conveyor and transported to a second storage vehicle that follows. The tomato vines that have been picked continue to travel on the conveyor and are placed back in the field. The hand harvester vehicle is designed to provide for occupant comfort and safety. This allows each individual to work in a safe environment and to use minimum energy for the delicate and technical tasks of hand picking select tomatoes without bruising them and with the greatest efficiency. The hand harvester has, by comparison to the mechanical harvester, very few moving mechanical parts other than the durable wheels and transport portion.

This invention includes a unique and simple curved conveyor system. The conveyor belt has a curved section that lifts the center of the vine and displays the tomato vine in front of the workers at a convenient angle for picking and inspection. This structure acts to push the tomatoes from the hidden center of the vine into plain view for convenient picking. In addition, items for personal comfort and safety provide for ideal working conditions. This includes clean air supply fans with filters and a unique air exhaust system with fans that blows dirt laden air over the tomato vines on the incoming belt. This forced exhaust air contains and picks up dust particles that act to bombard the tomatoes with very small projectiles (dust particles) that act to remove insects and other attached dust and dirt particles, thereby, removing loose dust, heat and moisture while cleaning the tomatoes. The net result is an extremely efficient combination of using people and machine to harvest tomatoes in the most efficient and practical manner to date.

Referring now to FIGS. 1–6 there are shown two forms of an enclosed air conditioned harvesting vehicle 10. The harvesting vehicle 10 in the preferred embodiment, of FIG. 1 is a self propelled vehicle somewhat similar in outer appearance to a bus. The harvesting vehicle 10 includes a cab and chassis assembly 17 carried on four wheels 16. In the same manner as a typical bus or truck, a seat and steering mechanism is provided for a driver 19. As in a conventional bus or truck the driver has a steering wheel and a steering linkage to turn the front wheels of the vehicle 10 and thus can select the direction of movement of the harvesting vehicle 10. Carried on the front end of the harvesting vehicle 10 is a cutting assembly 12 designed to sever the vines of tomato plants 22 from the roots thereof. The cutting assembly 12 is conventional and need not be described in detail. An inclined conveyor belt 13 extends from the ground level into the interior of the harvesting vehicle 10. The conveyor belt 13 transfers the vines with tomatoes attached thereto into the interior of the harvesting vehicle 10. In the Illustrated preferred embodiment the conveyor belt 13 passes under the driver 19 and discharges the vines with the tomatoes attached thereto on the upper flight 14a of conveyor belt 14 which extends nearly horizontally within the harvesting vehicle 10. The conveyor belt 14 is intended to carry the vines with attached tomatoes past a plurality of workers 18 who are positioned along both sides of the upper axial extent or upper flight 14a of the continuous belt 14. The workers may be standing as shown diagrammatically in FIG. 14 or they may be seated on seats as shown in FIGS. 2–5. Usually, the seated position is most comfortable and maximum productivity is usually achieved when the workers are most comfortable. The urgency of harvesting the crop rapidly within a small window of opportunity often necessitates long hours of operation. Therefore the seated position is usually most satisfactory.

Figure 9:
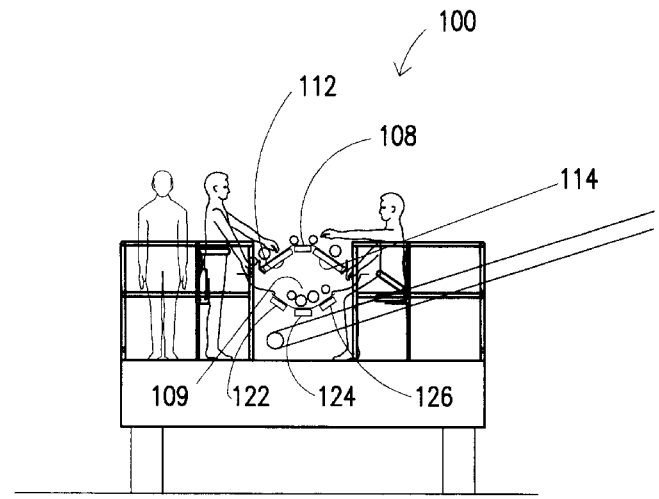
FIG. 9 is a schematic transverse cross-section view of an open type harvester vehicle shown in FIG. 7

Typically, at each of a plurality of axial positions along the upper flight 14a of the conveyor belt 14 their are disposed end abutting rollers in the same manner as is shown in greater detail in FIG. 9. (FIG. 9 illustrates a third embodiment and the structure is described in greater detail below.) More specifically in the case of the upper flight 14a of the belt 14 it is desired to have a crowned axially extending section that extends substantially the entire axial extent of the upper flight 14a of the belt 14.

Figure 2:
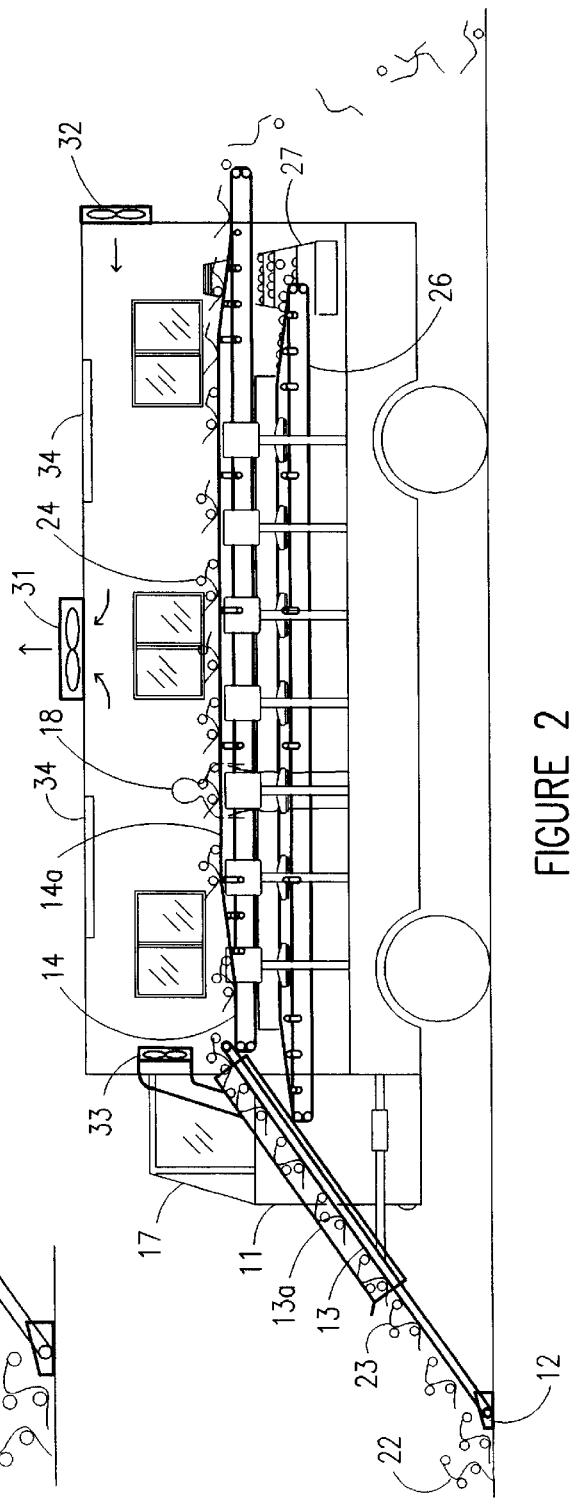
FIG. 2 is an enlarged schematic cross section elevation view illustrating a similar preferred enclosed type harvester vehicle and vine cutter of FIG. 1 in which the workers are seated.
Figure 4:
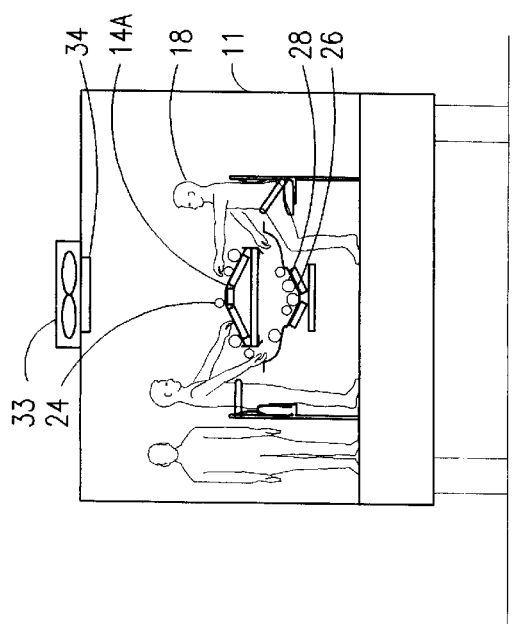
FIG. 4 is a schematic transverse cross section elevation view of the enclosed type harvester vehicle of FIG. 2 illustrating workers seated and standing at the curved conveyor belt in accordance with one form of the present invention.
Figure 5:
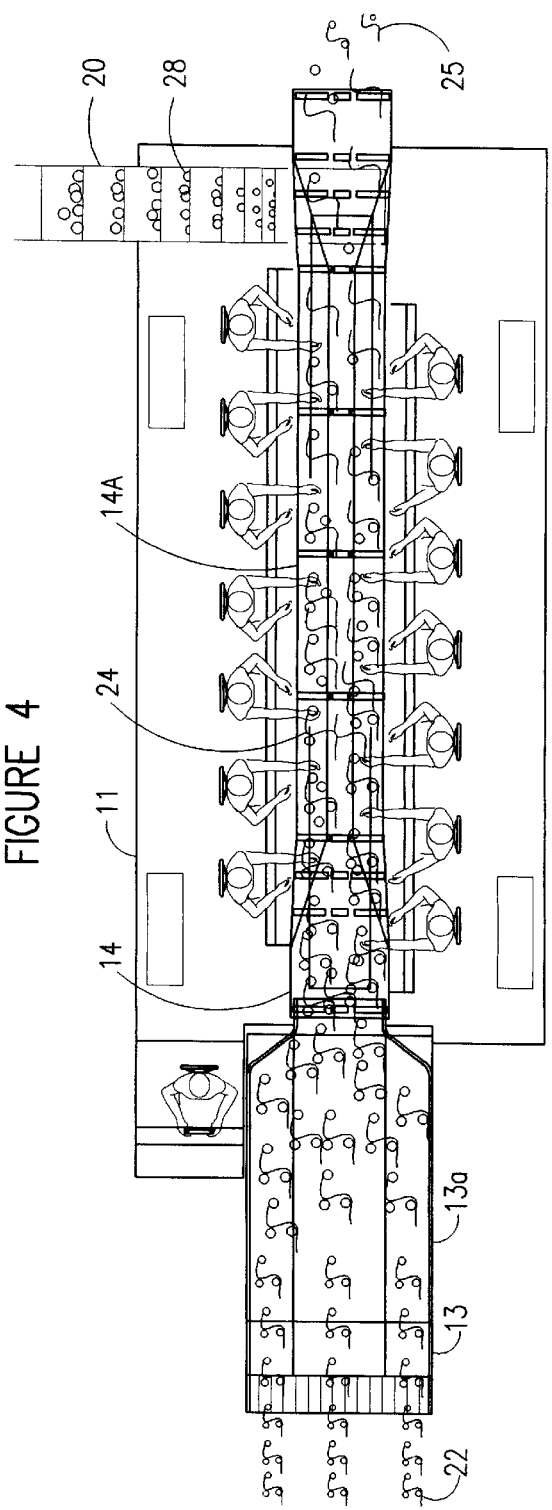
FIG. 5 is a schematic plan view of workers in the enclosed type harvester vehicle of FIG. 2 picking tomatoes from the conveyer belt.
Figure 6:
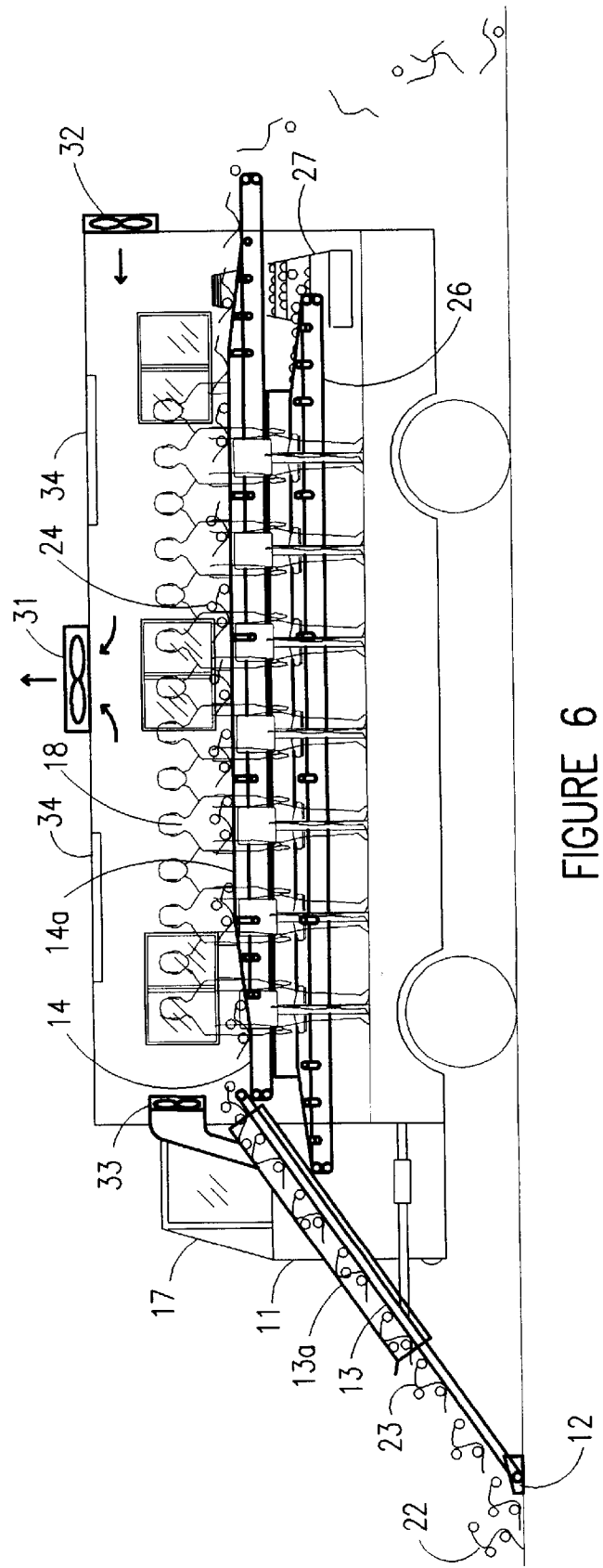
FIG. 6 is a schematic elevation view of the overall product flow with workers at the conveyer belts and the interior of the enclosed type harvester vehicle illustrated in FIG. 2.
Figure 8:
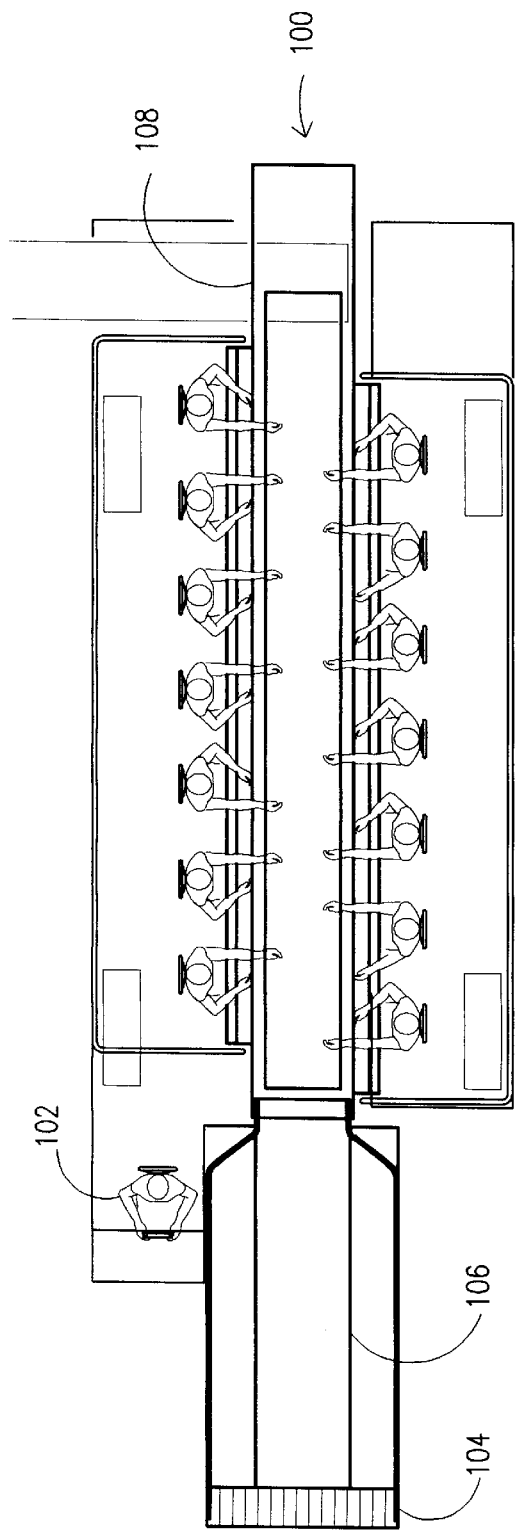
FIG. 8 is a schematic plan view of the open type harvester vehicle shown in FIG. 7.
Figure 7:
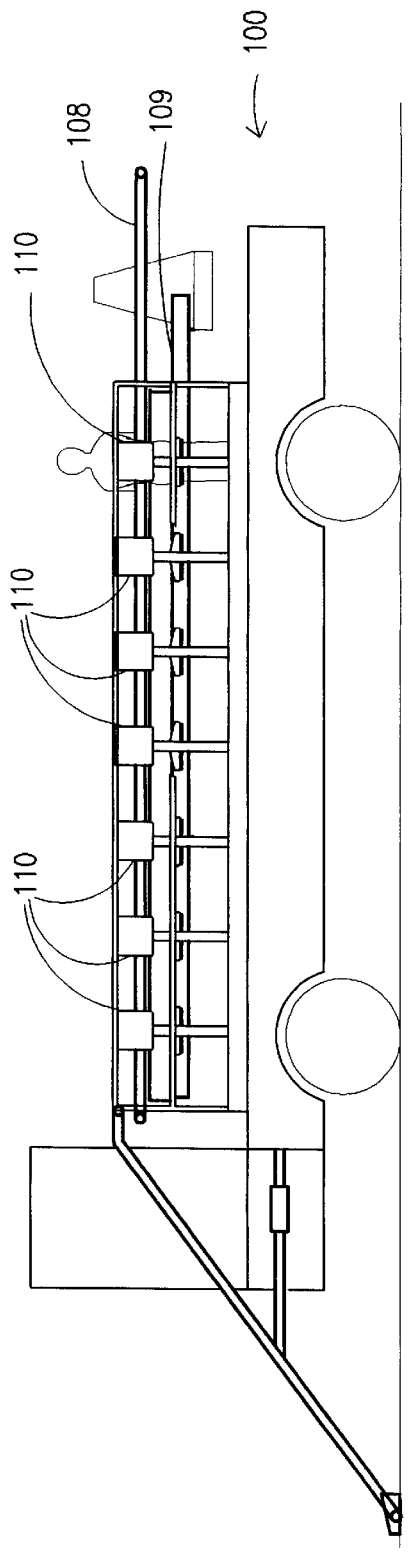
FIG. 7 is a schematic elevation view of one form of a third embodiment of the invention that incorporates an open type harvester vehicle.

Disposed within the harvesting vehicle 10 is a second continuous conveyor belt 26 that extends substantially horizontally at a lower elevation than the first continuous conveyor belt 14a period the first conveyor belt 14. The first conveyor belt 14 and the second conveyor belt 26 are preferably substantially parallel. As best seen in FIGS. 4 and 2 each conveyor belt 14, 26 is carried on rollers that support the return flight of the conveyor belt in relatively closely spaced relationship to the upper flight of the respective conveyor belt. Preferably, the respective conveyor belts 14, 26 are guided by a plurality of rollers to achieve a desired cross section. The desired cross sections in the preferred embodiment are illustrated in FIG. 4.

It will be seen that the upper conveyor belt 14 has an upper flight 14a which is crowned somewhat like a typical country road. (Such roads are typically referred to as being crowned.) In other words the axially extending central part of the upper flight 14a of the upper conveyor belt 14 is higher than the laterally adjacent parts which slope downwardly from the axially extending central part. This geometric relationship ordinarily will be achieved by three rollers disposed at each of a plurality of axial parts of the upper flight 14a of the upper conveyor belt 14. Each set of three rollers will include a relatively short roller that supports the "crown" of the upper flight 14a of the upper conveyor belt 14. Disposed at each axial extremity of the relatively short roller are first and second longer rollers that are each disposed in substantially in abutting relationship to the relatively short roller. These two longer rollers support the axially extending parts of the upper flight 14a of the upper conveyor belt 14 that extend laterally from the crown of the flight 14a. In other words the two longer rollers support the parts of the upper flight 14a that position the vines and tomatoes for optimum observation of the workers 18 that are positioned along the axial extent of the upper flight 14a of the upper belt 14. This geometric relationship facilitates access and visibility of the tomatoes being examined by the workers 18. It will also be seen that the lower conveyor belt 26 has a contour that is opposite to that of the upper conveyor belt 14.

The upper flight of the lower conveyor belt 26 is preferably concave to better capture tomatoes that are gently placed in the concave face thereof by the workers 18. Typically, only two end abutting rollers are disposed at each of a plurality of axial stations along the axial extent of the upper fight of the lower conveyor belt 26. The rollers typically are disposed at an angle of approximately thirty degrees with respect to a horizontal plane.

In operation the harvester vehicle 10 is directed along a row of tomatoes 22. The cutting assembly 12 in front of the vehicle 10 cuts the tomato vine 22 and transports the vines by the vine conveyor 13 to the conveyor 14 within the vehicle. The conveyer 14 has a flexible belt that is mounted on sets of rollers disposed at axially spaced parts of the upper flight thereof. These sets of rollers change the contour of the belt so that the tomato vines and tomatoes are displayed in an optimum manner to the workers 18 to facilitate their classification and culling procedures. The workers 18 then hand pick the tomatoes 24 and place them gently on the picked tomato conveyor 26 that transports them via an offset, inclined or swinging conveyor 27 then to a traveling storage vehicle 21 where the picked tomatoes 28 are stored during the picking process. The hand harvester vehicle 11 may contain a filtered air supply fan 32, even with evaporative cooling features if necessary, for the comfort of the workers 18. Exhaust fans 31 may be placed at high points to evacuate hot air.

Forced air exhaust fans 33 cause dust particles to be picked up from the tomato vines as the air travels within the partially enclosed incoming conveyer 13a with deflector vanes. This dust laden exhaust air with entrained dust particles travel over and around the incoming tomato vines 23 located in the incoming tomato conveyer belt 13a and acts to removes loose dust, dirt, insects, heat and moisture, thereby pre-cleaning the tomatoes for safer hand picking. The interior of the enclosed harvester vehicle may contain lighting 34 for cool night time operation when the tomatoes 24 are best picked.

Figure 10:
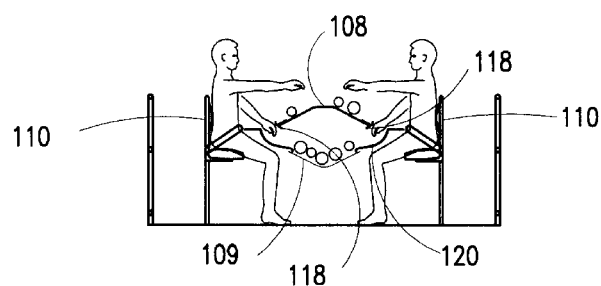
FIG. 10 is a more detailed schematic transverse cross-section, similar to the view of FIG. 9, showing workers seated at the curved conveyer belt picking tomatoes in the embodiment of FIG. 7.
Figure 11:
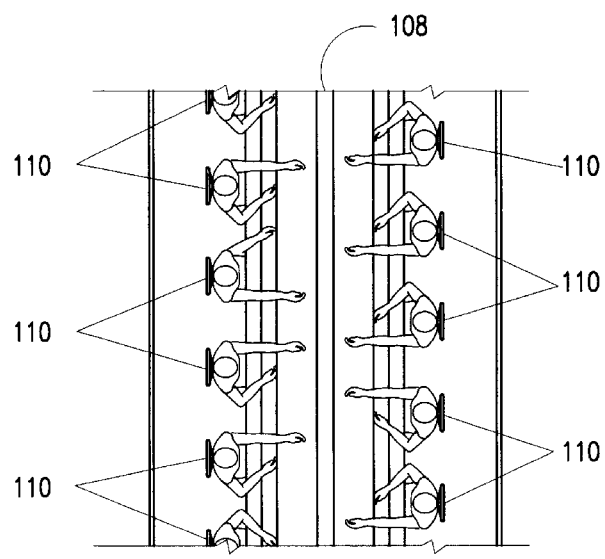
FIG. 11 is a schematic partial plan view of the workers in a seated position in the open type harvester vehicle of FIG. 7.

Referring now to FIGS. 7–11 there is shown a second embodiment 100 of the present invention. This embodiment 100 the present invention of also includes a self powered vehicle having a driver 102. A cutting device 104 is supported at ground level forward of the vehicle. A conveyor belt 106 moves the vines and tomatoes upwardly to a main conveyor belt 108. A plurality of seats 110 are disposed along each side of the main conveyor belt to accommodate a plurality of workers. The main conveyor belt 108 is carried on rollers that support the upper flight so that the top surface thereof is convex. As in the embodiment of FIGS. 1–6 there is a second belt 109 and the top surface of the bottom belt 109 is concave as best seen and FIGS. 9 and 10. FIG. 9 has been simplified to the better illustrate the position of the rollers supporting the belts 108 and 109. The location of the three rollers 112, and 114 is shown in FIG. 9. The rollers 112,114 are disposed within the respective axes thereof at an angle of approximately 45 degrees with respect to a horizontal plane. The axes of the illustrated rollers 112, and 114 are co-planar. It will be understood that substantially the entire extent of the top flight of the main conveyor belt 108 will have the same concave upper surface as best seen in FIGS. 9 and 10. Accordingly, there are sets of rollers 112, and 114 disposed at axially spaced intervals along the axial extent of the upper flight of the belt 108. As best seen in FIGS. 8, 9 10, and 11 the upper flight of the main conveyor belt 108 is readily accessible to be workers sitting in the seats 110. Typically, a stationary lip 118 is mounted adjacent to the sides of the upper flight of the belt 108 along the entire axial extent of the upper flight thereof. The lip 118 serves to catch any tomatoes that roll down the downwardly sloped face of the belt 108. Thus, a worker will have sufficient time to sort the tomatoes. Tomatoes that are not plucked from the vine by the workers pass to the rear of the vehicle and onto the ground.

Tomatoes that are picked by the workers are placed on an axially extending ramp 120 that extends along the axial extent of the upper flight of the belt 109 and which further extends over the respective laps of all the individual workers on one side of the vehicle 100. A similar extending ramp 120 also extends along the axial extent of the upper flight of the belt 109 and extends over the respective laps of all of the individual workers on the other side of the vehicle 100.

Thus, the workers can gently move the good tomatoes to the lower belt 109 without causing any damage to the tomato and without substantial effort on the part of the worker. The lower belt 109 is supported by three rollers 122,124, and 126 at each of a plurality of axially spaced locations along the axial extent of the lower flight. The rollers 122,124 in 126 at each axial location have respective axes that are coplanar. Tomatoes that are picked by the workers are placed on one of the axially extending ramps 120. The axially extending ramps 120 extend throughout substantially the entire axial extent of the lower belt 109.

The embodiment of FIGS. 7–11 does not include the ventilation system of the embodiment illustrated in FIGS. 1–6. Accordingly, the embodiment of the FIGS. 7–11 embodiment does not rely on ventilation air to clean the tomatoes with air blasting or dirt blasting to clean the freshly picked tomatoes.

Areas of substantial improvement over the prior art include: 1. Unique curved conveyer belt that positions the tomatoes on a slant, in front of the workers, for ease of picking to accomplish ideal ergonomic working conditions.

2. A machine that cuts the tomato vines and completes the labor intensive tasks and delivers them to the workers stationed in a conditioned vehicle.

3. A conditioned harvester vehicle with lighting and filtered ventilation air to create ideal working conditions for hand picking the tomatoes.

4. A unique forced air exhaust system that uses entrained dirt and dust particles to clean, dry and cool the incoming tomatoes. The exhaust air system incorporates a torturous air flow path where dust laden air is forced over and around the incoming tomatoes in such a way that even insects are removed. Dirt is thereby used to remove dirt in a counter-flow direction.

The machine portion can easily take care of the difficult, dangerous, time consuming and costly tasks of traveling down the rows of tomatoes and cutting the vines and transporting them by conveyor to a convenient point where manpower can do the necessary tasks best done by humans. This includes decision making in selecting and picking the tomatoes in a delicate way that can only be done by hand without bruising the tomatoes, while looking for defects, sorting, and discarding deficient tomatoes. The machine portion works to keep the human element making the important and technical decisions in order to result in the most practical and economical method of harvesting tomatoes to date. The net result is less cost to the consumer, higher quality tomatoes and safer working conditions for the workers.

This hand harvester invention has been described with use in the tomato industry, however, the teachings and claims of this invention have application in picking other vine type fruits and vegetables such as cucumbers and the like.

The invention has been described with respect to its illustrated preferred embodiments. Persons skilled to the in the art of such devices may upon exposure to the teachings herein conceive other variations. Such variations are deemed to be encompassed by the disclosure, the invention being delimited only by the following claims.

What is claimed is:

1. Apparatus for harvesting produce, which comprises:

an enclosed vehicle;

a first conveyor belt extending forward of said enclosed vehicle for moving the produce and associated vines into said enclosed vehicle; said apparatus further including a ventilation system for drawing air from within said enclosed vehicle and expelling the air through an outlet, said outlet being disposed in alignment with said first conveyer belt to direct exhaust air from said enclosed vehicle toward the produce on said first conveyor belt whereby some dirt is dislodged from the produce and vines disposed on said first conveyor belt, said outlet being disposed to direct a stream of air from said enclosed vehicle in a direction that is aligned with an axis of said first conveyor belt, said apparatus further includes a second conveyor belt disposed within said enclosed vehicle, said second conveyor belt being aligned and disposed with respect to said first conveyor belt for receiving the produce and vines from said first conveyor belt; said apparatus further includes a third conveyor belt disposed within said enclosed vehicle, said third conveyor belt being substantially aligned with respect to said second conveyor belt; said second conveyor belt having an upper flight and said upper flight is crowned whereby workers standing on sides of said second conveyor belt are better able to see the produce and vines being carried on said second conveyor belt.

2. The apparatus as described in claim 1 wherein:

said third conveyer belt has an upper flight that is concave whereby produce is better contained on said third conveyer belt.

* * * * *